(12) United States Patent
Sutherland et al.

(10) Patent No.: US 12,331,772 B2
(45) Date of Patent: Jun. 17, 2025

(54) RADIAL FLOW PLUNGER LIFT LUBRICATOR

(71) Applicant: Kaizen Well Solutions Ltd., Red Deer County (CA)

(72) Inventors: Michael T. Sutherland, Calgary (CA); Clint Mason, Carstairs (CA); Kelly John Mason, Starland County (CA); Timothy Dean Hadland, Sylvan Lake (CA)

(73) Assignee: Kaizen Well Solutions Ltd., Red Deer County (CA)

( * ) Notice: Subject to any disclaimer, the term of this patent is extended or adjusted under 35 U.S.C. 154(b) by 0 days.

(21) Appl. No.: 18/622,372

(22) Filed: Mar. 29, 2024

(65) Prior Publication Data

US 2024/0240663 A1 Jul. 18, 2024

Related U.S. Application Data (63) Continuation of application No. 17/861,620, filed on Jul. 11, 2022, now Pat. No. 11,971,064.

(60) Provisional application No. 63/219,982, filed on Jul. 9, 2021.

(51) Int. Cl.
  *E21B 43/12* (2006.01)
  *E21B 34/14* (2006.01)
  *F16B 21/12* (2006.01)
  *F16B 39/04* (2006.01)

(52) U.S. Cl.
  CPC ............. *F16B 39/04* (2013.01); *E21B 34/14* (2013.01); *E21B 43/121* (2013.01); *F16B 21/12* (2013.01)

(58) Field of Classification Search
  CPC ..................................................... E21B 43/121
  See application file for complete search history.

(56) References Cited

U.S. PATENT DOCUMENTS

| | | | |
|---|---|---|---|
| 1,815,364 A * | 7/1931 | Ricker | F04B 47/12 417/56 |
| 1,844,074 A * | 2/1932 | Ricker | F04B 47/12 166/372 |
| 5,012,864 A * | 5/1991 | Enright | E21B 43/121 166/97.1 |
| 7,328,748 B2 | 2/2008 | Giacomino | |
| 8,485,262 B1 | 7/2013 | Angers | |
| 8,485,263 B2 | 7/2013 | Lembcke | |
| 9,909,402 B2 | 3/2018 | Armistead | |
| 9,945,200 B2 | 4/2018 | Travis et al. | |
| 10,689,956 B2 | 6/2020 | Agarwal et al. | |
| 11,208,874 B2 | 12/2021 | Murdoch et al. | |
| 11,952,855 B2 | 4/2024 | Angers, Jr. | |

(Continued)

FOREIGN PATENT DOCUMENTS

| CN | 206376827 U | 8/2017 |
|---|---|---|
| CN | 110847843 B | 11/2021 |

*Primary Examiner* — Steven A MacDonald
(74) *Attorney, Agent, or Firm* — Justin R. Jackson; Peacock Law P.C.

(57) ABSTRACT

A plunger lift lubricator having an internal bypass configuration which enables a plunger to be reliably captured and while still allowing the flow of fluid up through the lubricator before the fluid is directed radially outward and down the internal bypass passageways. The lubricator can comprise both an upper flow path and a lower flow path and can be configured such that a plunger can travel all the way up to shift a valve in the plunger if needed.

21 Claims, 12 Drawing Sheets

(56) References Cited

U.S. PATENT DOCUMENTS

| | | | |
|---|---|---|---|
| 2005/0056416 A1 | 3/2005 | Gray et al. | |
| 2005/0241819 A1* | 11/2005 | Victor | E21B 43/121 166/68 |
| 2006/0108126 A1* | 5/2006 | Horn | F04B 47/12 166/105 |
| 2015/0176377 A1* | 6/2015 | Agarwal | E21B 17/07 166/372 |
| 2016/0069165 A1 | 3/2016 | Stokes et al. | |
| 2017/0044882 A1* | 2/2017 | Casey | E21B 33/03 |
| 2017/0107800 A1* | 4/2017 | Townsend | F04B 47/12 |
| 2022/0290499 A1* | 9/2022 | Geldenhuys | F16N 7/14 |
| 2023/0008526 A1 | 1/2023 | Sutherland et al. | |
| 2023/0175350 A1* | 6/2023 | Freeman | E21B 34/02 166/75.11 |
| 2025/0035108 A1 | 1/2025 | Buttnor et al. | |

* cited by examiner

RADIAL FLOW PLUNGER LIFT LUBRICATOR

CROSS-REFERENCE TO RELATED APPLICATIONS

This application is a continuation of U.S. patent application Ser. No. 17/692,849, entitled "Radial Flow Plunger Lift Lubricator", filed on Jul. 11, 2022, which itself claims priority to and the benefit of the filing of U.S. Provisional Patent Application No. 63/219,982, entitled "Radial Flow Plunger Lift Lubricator and Tangential Pin Connection", filed on Jul. 9, 2021, and the specification thereof is incorporated herein by reference.

BACKGROUND OF THE INVENTION

Embodiments of the present invention relate to a radial flow lubricator for a plunger lift system. Prior to the invention of embodiments of the disclosed invention, it was difficult to operate a continuous style plunger of either a two-piece or valve operated plunger type and have it reliably and automatically catch in the lubricator body and still allow bypass around the plunger. Traditional flanged or threaded connection configurations (for example, traditional connections) require excessive material to achieve adequate internal flow bypass area. There is thus a present need for a plunger lift lubricator that does provide adequate internal flow bypass area.

BRIEF SUMMARY OF EMBODIMENTS OF THE PRESENT INVENTION

Embodiments of the present invention relate to a plunger lift lubricator having a plunger holding area, at least one internal bypass passage which extends at least a length of a plunger holding area and which is positioned such that it is not blocked by a plunger when the plunger is disposed within the plunger holding area, and an upper flow path, the upper flow path having at least one upper opening providing fluid communication between an interior of the plunger lift lubricator and the at least one internal bypass passage. The at least one upper opening can include a plurality of openings and the plurality of openings can be arranged radially about a primary axis of the plunger lift lubricator.

In one embodiment, the at least one internal bypass passage can include an annulus formed between an exterior of the plunger holding area and a body of the plunger lift lubricator. The at least one internal bypass passage can include a plurality of passages disposed outside of the plunger holding area. The plunger holding area can include a sleeve within which the plunger is held. The at least one internal bypass passage can include a plurality of channels formed on an outside of the plunger holding area. The at least one internal bypass passage can include a plurality of channels formed on an interior of a body of the plunger lift lubricator such that when the sleeve is positioned within the body, the plurality of internal bypass passages are formed within the plurality of channels. The plunger lift lubricator can also include a lower flow path. The lower flow path can include at least one lower opening positioned such that it is below a plunger when the plunger is fully seated up into the plunger holding area. The at least one lower opening can be disposed through a sleeve which forms the plunger holding area. The at least one lower opening can include a plurality of lower openings. The plunger lift lubricator can also include a plunger catching mechanism.

Embodiments of the present invention also relate to a method for producing fluids through a plunger while the plunger is disposed in a plunger lift lubricator, including flowing fluid up through the plunger, directing the fluid out radially to a distance beyond an outside circumference of the plunger, then allowing the fluid to flow down past the plunger through at least one passage while the plunger is disposed within the plunger lift lubricator. Allowing the fluid to flow down past the plunger through at least one passage can include directing the fluid radially to a distance beyond an outside circumference of the plunger. The method can also include simultaneously allowing fluid to be produced by directing the fluid radially outward before the fluid reaches the plunger. The method can also include allowing fluid that passed up through the plunger to be merged together with fluid that did not pass up through the plunger before any of the fluid exits a plunger lift lubricator. The method can also include activating a mechanism to capture the plunger such that the plunger is held within the plunger lift lubricator.

In one embodiment, the step of allowing the fluid to flow down past the plunger through at least one passage can include allowing the fluid to flow down through an annulus formed between an exterior of a sleeve and an interior of a body of the plunger lift lubricator. Allowing the fluid to flow down past the plunger through at least one passage can optionally include allowing the fluid to flow through a plurality of passages arranged circumferentially around an exterior of a plunger holding area of the plunger lift lubricator. Directing the fluid out radially to a distance beyond an outside circumference of the plunger can include directing the fluid out radially through a plurality of openings that are arranged circumferentially, and which plurality of openings can be disposed above a top of the plunger when the plunger is disposed within the plunger lift lubricator.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention relate to a radial flow plunger lift lubricator that is configured to receive a plunger and provide an enclosure for a deceleration device when the plunger is brought to surface by flowing the well. Referring now to the figures, radial flow plunger lift lubricator 10 preferably includes lubricator body 12, which can optionally be a one-piece body or a multi-piece body, that has lower flow path 14 and upper flow path 16. This provides the ability for plunger 20 (see FIG. 1C) to travel all the way up such that if plunger 20 is a free cycle plunger which needs to strike the top of the plunger against something to shift a valve in the plunger, it can travel all the way up to do so. Most preferably lower flow path 14 comprises one or more lower openings 22 which, if more than one opening is provided, are most preferably arranged in a radial pattern such that lower openings 22 are radially around a circumference of sleeve 24. Most preferably, one or more discharge outlets 26 are disposed through lubricator body 12 at a location that is adjacent to lower openings 22. However, discharge outlets 26 can be positioned at a location not adjacent to lower openings 22 and plunger lift lubricator will still provide desirable results.

In one embodiment, upper flow path 16 comprises upper chamber 30 which most preferably comprises an inner diameter which is larger than an inner diameter of sleeve 24 where one or more lower openings 22 are provided. In this embodiment, one, and most preferably a plurality of upper openings 32 are preferably disposed in upper chamber 30. Most preferably one or more upper openings 32 are disposed radially around a circumference of upper chamber 30. Most preferably one or more internal bypass passages 40 are provided around an outside of sleeve 24 but within lubricator body 12, which provides a passage for a flow of fluid from the one or more upper openings 32 to discharge outlets 26. In one embodiment, bypass passage 40 can comprise an annulus that is formed between an outside of sleeve 24 and an internal surface of lubricator body 12.

By adjusting the size and number of lower openings 22 and/or upper openings 32, the proportion of fluid that flows below plunger 20 and above plunger 20 can be adjusted. Although the percentage of such flow can be adjusted to be any desirable amount for a given application, in one embodiment, the size and number of lower openings 22 and upper openings 32 are most preferably adjusted to allow plunger 20 to maintain position in lubricator 10 such that about 5% to about 90% of the flow passes through upper openings 32 and more preferably about 20% to about 60% of the total flow passes through upper openings 32 and most preferably about 40% of the total flow passes through upper openings 32, with the remaining percentage preferably passing through lower openings 22.

Embodiments of the present invention thus allow at least a portion of the total flow to traverse plunger 20 of a plunger lift system, and/or a plunger catcher and allows the flow to return to an outlet chamber while holding any style of plunger, including a continuous flow plunger, in place during the flow cycle. Sleeve 24 can be modified to restrict flow to outlet to control position of plunger 20 while a well is flowing. Thus, in one embodiment, sleeve 24 comprises internal dimensions which are larger than external dimensions of plunger 20. In one embodiment, the internal diameter of sleeve 24 is preferably at least 0.010 inches larger than plunger 20.

In one embodiment, a top cap assembly, which can optionally include or otherwise contain a deceleration device, for example spring 42 and/or disc 44, can preferably be threaded onto an upper portion of lubricator body 12, thus sealing the radial flow plunger lift lubricator 10 while being able to contain the internal pressure.

In one embodiment, sleeve 24 can be disposed inside of a lower portion of lubricator body 12 and an upper portion of lubricator body 12 can be bolted, threaded into/onto or otherwise secured to the lower portion of lubricator body 12, with a top cap assembly threaded into/onto or otherwise secured to the top portion of the upper portion of lubricator body 12, thus sealing sleeve 24 in the lower portion of lubricator body 12.

Radial flow plunger lift lubricator 10 allows access to sleeve 24 either through the removal of an upper portion of lubricator body 12 or by removing a deceleration spring housing from a top portion of lubricator body 12. Sleeve 24 allows a larger flow area and flow path to allow minimal restrictions when plunger 20 is sitting at surface. The ability to remove an upper portion of lubricator body 12 and/or a housing which encloses deceleration spring housing 42, provides access to sleeve 24 for removal, inspection, and/or replacement.

Regardless of whether a single or multi-part lubricator body 12 is used, the basic operation and/or internal functioning and configuration of radial flow plunger lift lubricator 10 remains the same. For example, if lubricator body 12 is a one-piece configuration, lubricator body 12 can accommodate sleeve 24 if sleeve 24 is held in place with a removable cap instead of an upper portion of lubricator body 12. These components can be installed with minimal modification to the flow lines gathering system.

Radial flow plunger lift lubricator 10 can optionally be installed as original equipment or retrofitted on a wellhead. It is not required to remove the wing valve to fit the lubricator 10 in the flow tee space and it will preferably fit into a standard wellhead flow cross or flow tee assembly measurements and can optionally be bolt on and/or thread in place of an existing flow block. In one embodiment, radial flow plunger lift lubricator 10 preferably provides a flow path that distributes the flowing material across multiple points within the outer flow path of lubricator 10 and directs these multiple points to a single elevation point on the wellhead and flow line configuration.

The distribution of flow across multiple points within lubricator 10 can also reduce the fluid velocities and thus minimize the amount of erosion and wear that occur during high flow rates. By providing one or more bypass passages 40 within radial flow plunger lift lubricator 10, this allows upper flow path 16 to remain within the body of lubricator 10, thereby eliminating welding, bolting or flanging or any other external bypass method or connections. In addition, by adjusting the lower flow bypass area, for example by choking or changing the size and/or number of lower openings 22 in sleeve 24, lubricator 10 can be adjusted for different flow rates and pressure conditions while keeping plunger 20 from oscillating, chattering, or excessively restricting flow. This allows optimum operation and plunger wear life, while delivering optimum production. By having the bypass passages 40 internal within body 12 of lubricator 10, the flow is less impacted by ambient cold air temperatures as compared to conventional external bypass lubricator configurations. This reduces the deposition of paraffins, as well as the formation of hydrates and/or ice.

In one embodiment, bypass passages 40 can optionally be:
1) concentric such that the flow is directed from the inner portion of sleeve 24 to the space between sleeve 24 and lubricator body 12;
2) a series of tubes or ports disposed around an outside circumference of sleeve 24; and
3) notches, channels or other flow conduits or structures formed on an outside circumference of sleeve 24 and/or formed on an inside surface of lubricator body 12.

By providing internal bypass passages 40 and adjusting the proportional flow through upper openings 32 and lower openings 22, any excess flow or backpressure not required to hold plunger 20 in position within sleeve 24 will flow through the lower internal flow path 14.

Optionally, adjustable and/or non-adjustable chokes or other restriction devices can be coupled, inserted into, or otherwise configured into and/or onto lower openings 22, to restrict the flow of fluids therethrough. This allows a user to adjust the percentage of flow that passes through upper openings 32 and/or other lower openings 22 along sleeve 24. This allows for proper placement and position of plunger 20 when it is operating. In one embodiment, the relative flow rate between upper flow path 16 and lower flow path 14 can be adjusted by removing and replacing sleeve 24 with one having less or more area for openings 22. Alternatively, more lower openings 22 can be added to sleeve 24, or the size of one or more existing lower openings 22 can be increased, to increase the percentage of flow that is allowed to flow through lower flow path 14

In one embodiment, lubricator 10 can provide desirable results for any type of plunger, including but not limited to any style of continuous plunger of either a two piece or valve operated configuration. The type of plunger used does not require a change in the construction of lubricator 10.

Figure 1A:
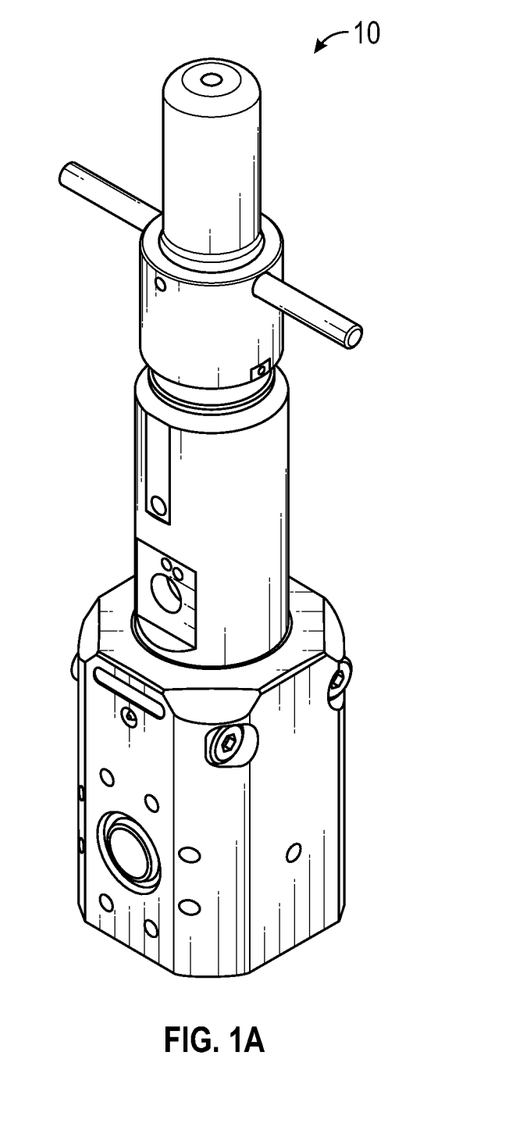
FIG. 1A is a drawing which illustrates a perspective and sectional views of a radial flow plunger lift lubricator of an embodiment of the present invention.
Figure 1B:
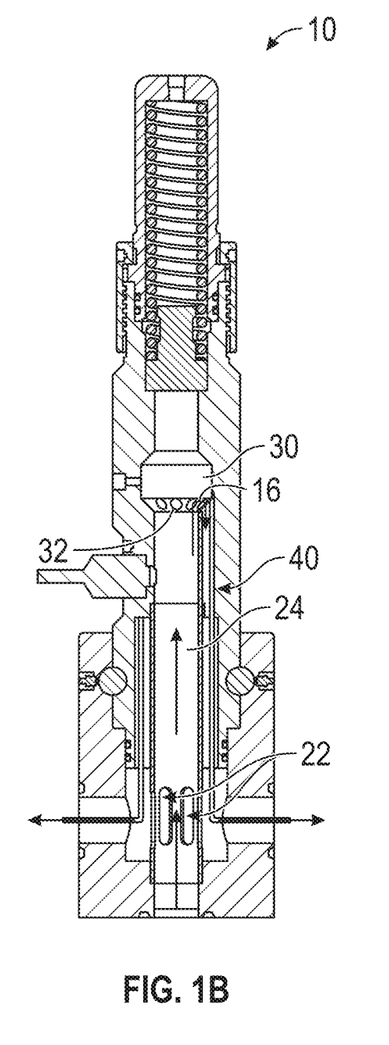
FIG. 1B is a cut-away view drawings of a radial flow plunger lift lubricator wherein the outer portions have been removed along a centerline to expose and illustrate internal features and flow paths thereof.
Figure 1C:
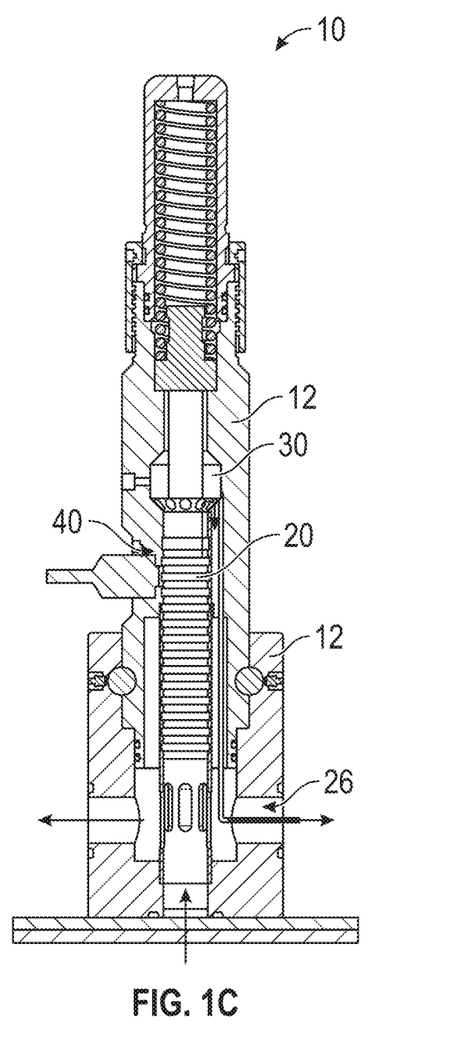
FIG. 1C is a cut-away view drawings of a radial flow plunger lift lubricator wherein the outer portions have been removed along a centerline and wherein a plunger is disposed within the lubricator.
Figure 2:
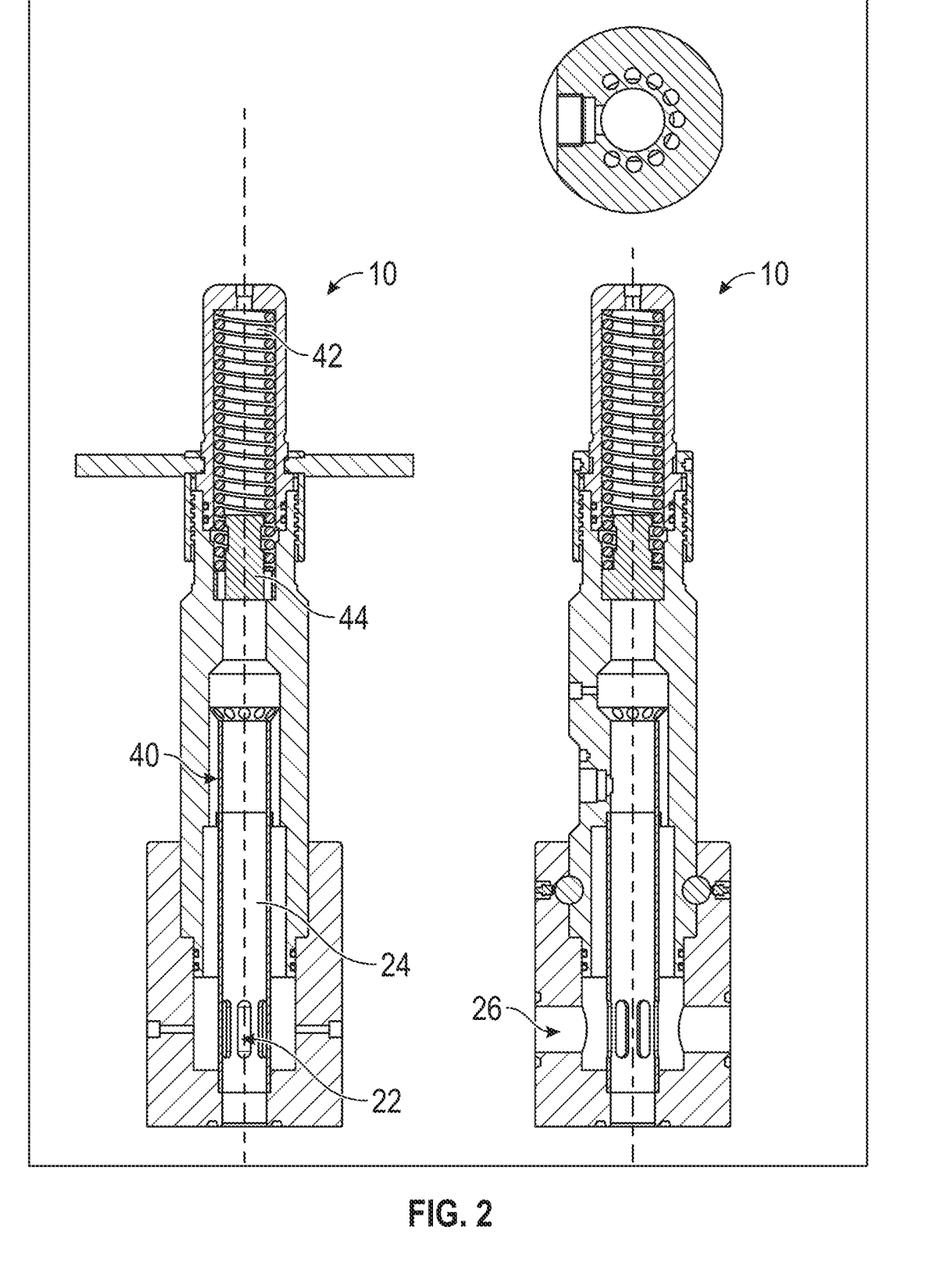
FIG. 2 is a drawing which illustrates sectional views from different perspectives to show internal features of a radial flow plunger lift lubricator according to an embodiment of the present invention.
Figure 3:
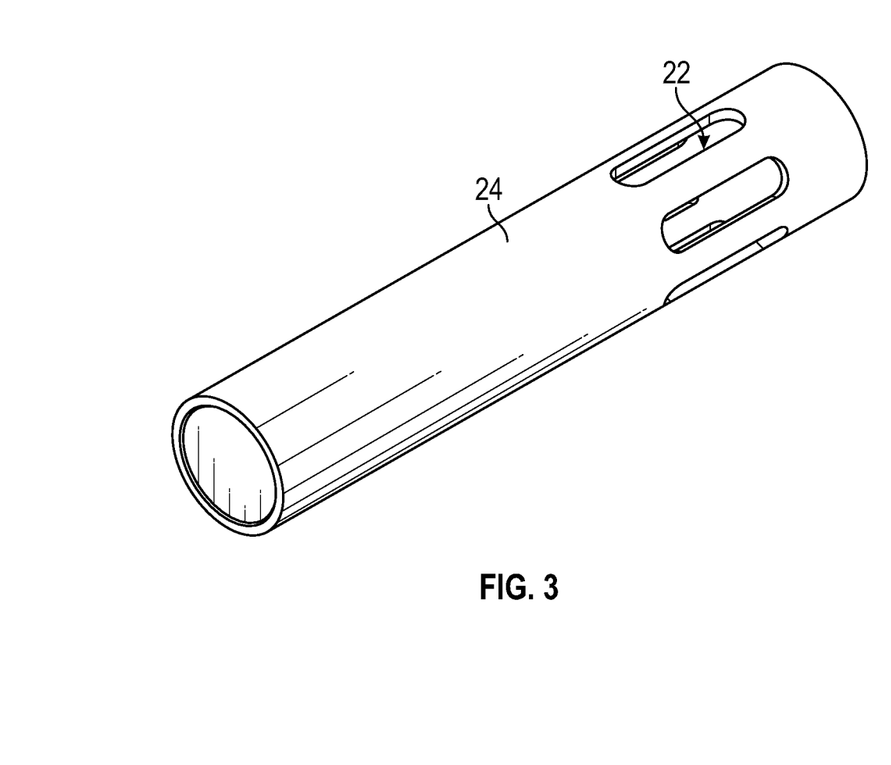
FIG. 3 is a drawing which illustrates a perspective view of an internal sleeve of a radial flow plunger lift lubricator with a plurality of bottom openings disposed radially around the sleeve near a lower end portion thereof.

Embodiments of the present invention also relate to an internal bypass lubricator having concentric flow through inner and outer flow paths, a series of tubes and/or ports disposed around a circumference of the inner flow path as best illustrated in FIGS. 1A and 2. One or more notches, channels or other flow conduits and/or paths around the circumference of the inner flow path are preferably provided. In one embodiment, any excess flow or backpressure not required to hold the plunger in position will flow through the lower internal flow path. In one embodiment, the internal flow path is preferably radial and/or concentric and is adjustable to control the discharge of excess flow or backpressure not required to hold the plunger properly in position during the flow cycle, to minimize excess backpressure on the production system. Methods to adjust this can include an adjustable sleeve or other apparatus or structure to block or restrict the flow path on the lower internal flow area, increase or decrease total flow area by addition or removal of holes or slots or a modification of the holes or slots, and/or installation of restrictors or reducers on or in holes or slots.

Figure 4A:
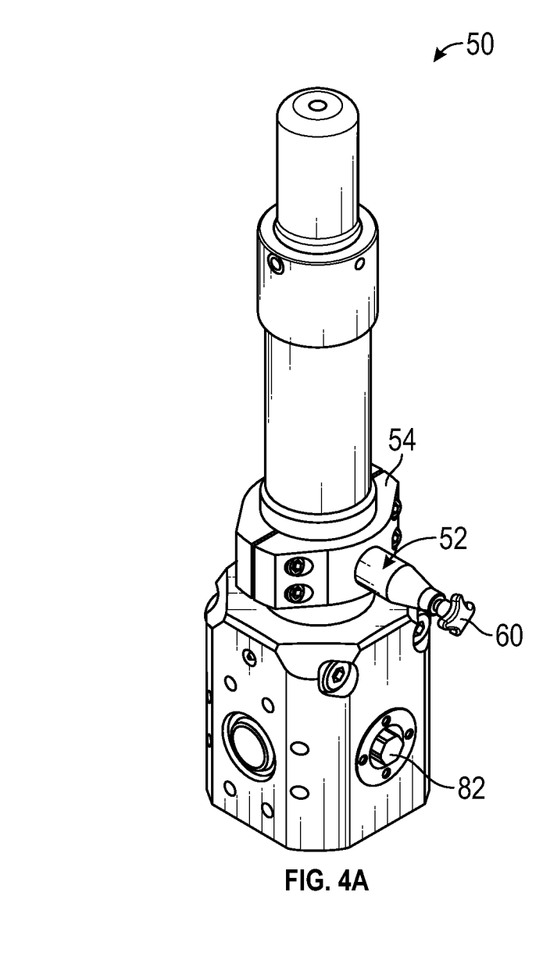
FIGS. 4A and 4B are drawings which respectively illustrated a perspective view and sectional views of a radial flow plunger lift lubricator which has a plunger catch and flow control according to an embodiment of the present invention.
Figure 4B:
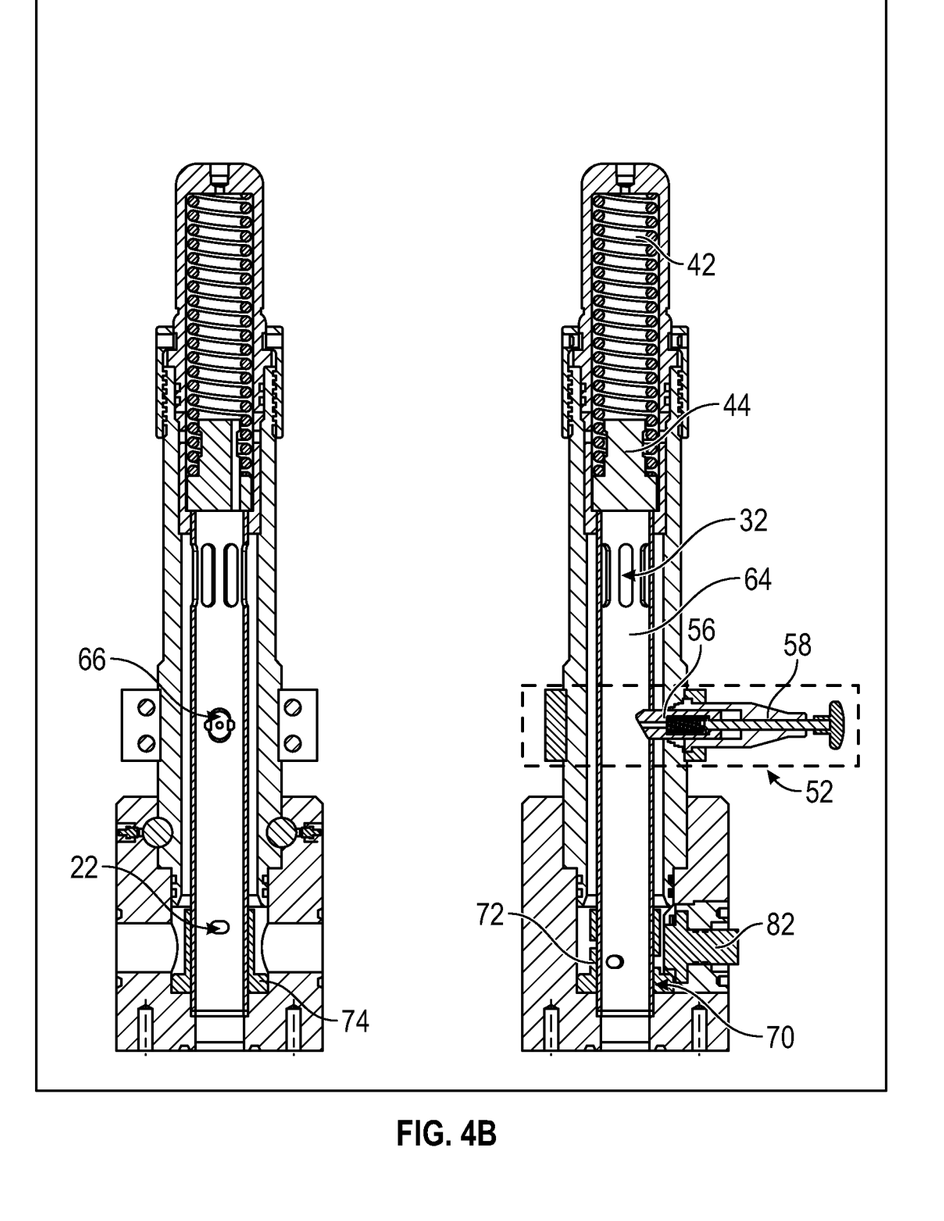
Figure 5:
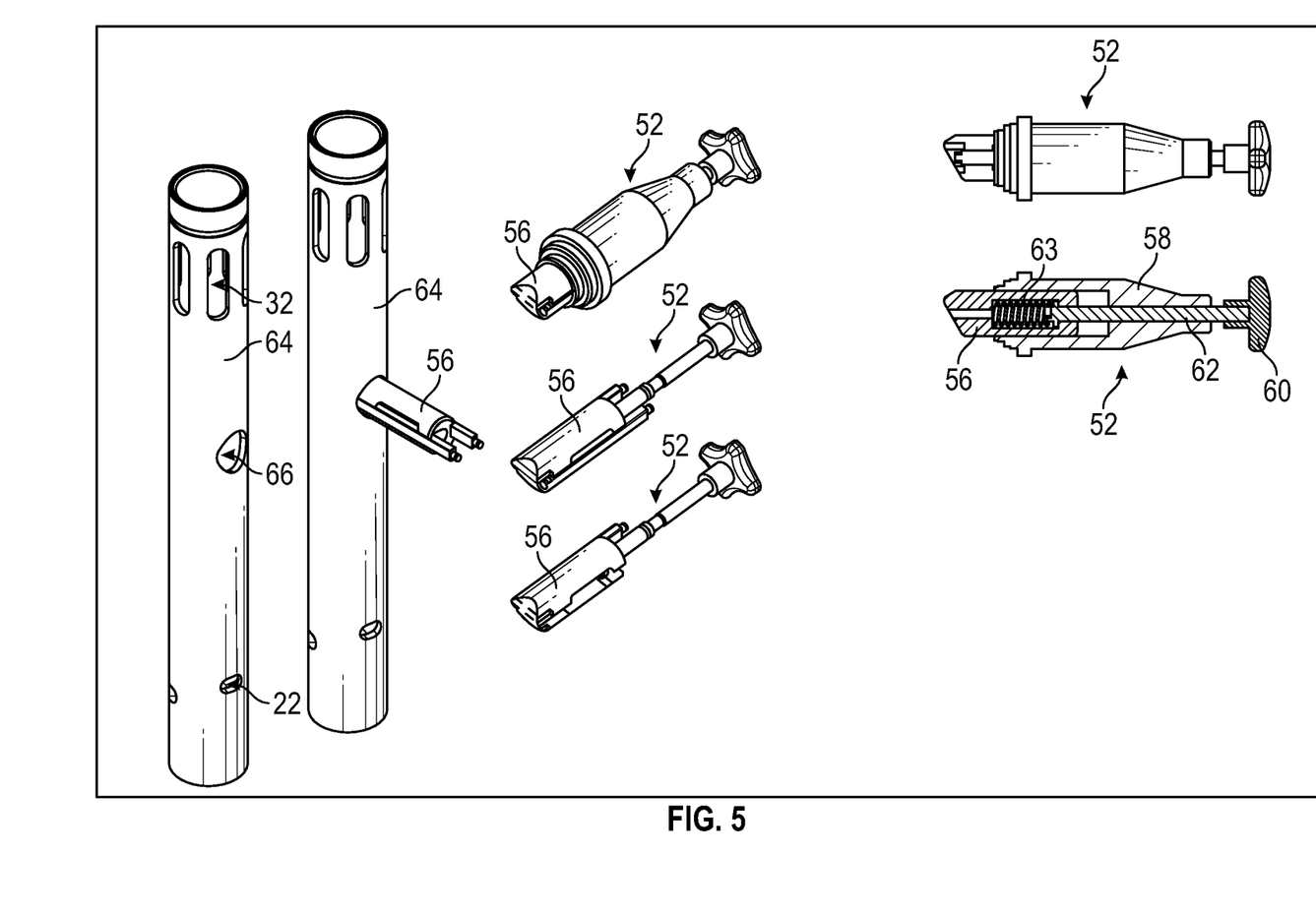
FIG. 5 is drawing which illustrates portions of a plunger catch mechanism and where it can insert into a sleeve of a plunger lift lubricator according to an embodiment of the present invention.
Figure 6:
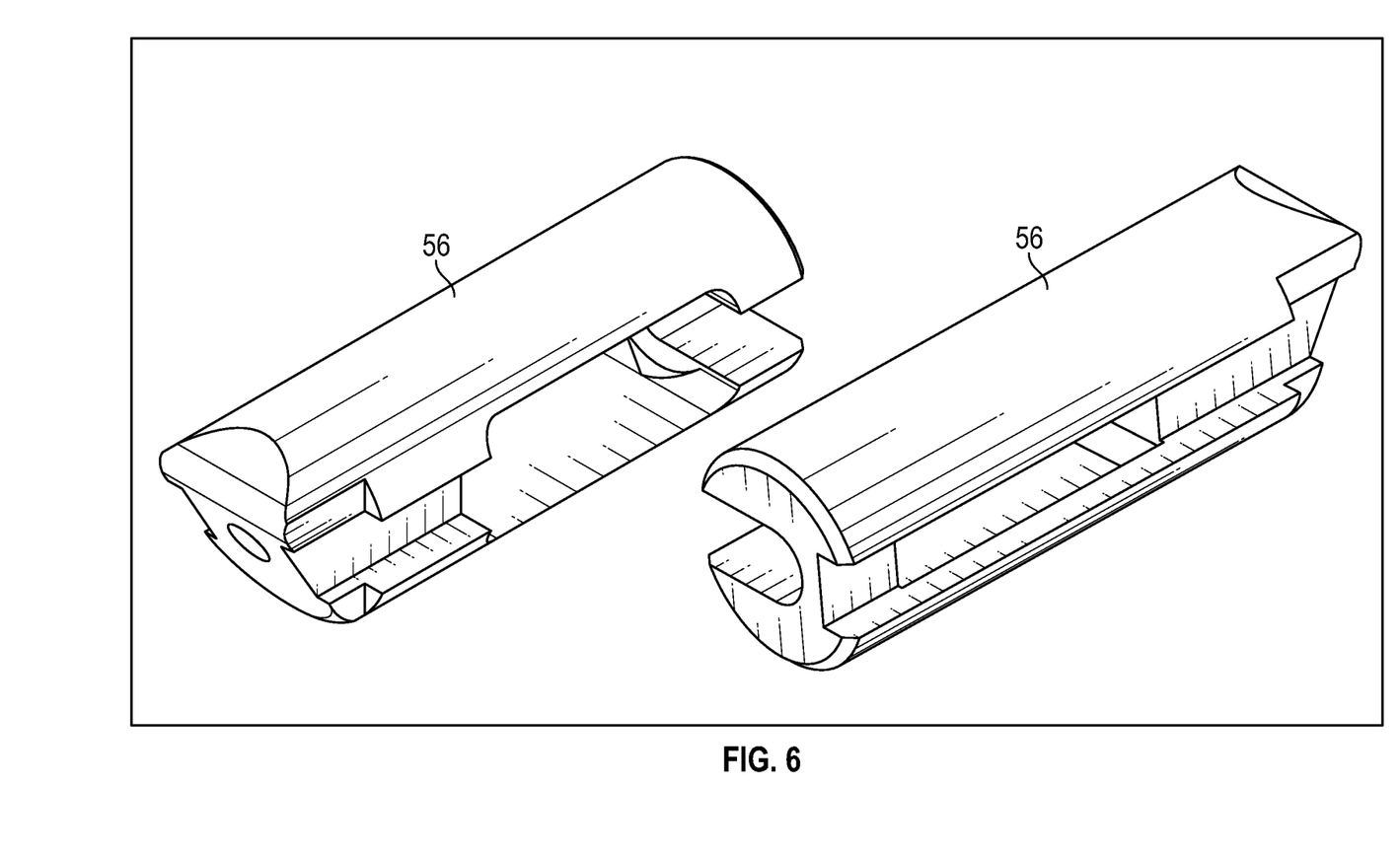
FIG. 6 is a drawing which illustrate a sliding latch of a plunger catch mechanism from different perspectives according to an embodiment of the present invention.

As best illustrated in FIGS. 4A and 4B, in one embodiment, lubricator 50 can optionally be provided. Lubricator 50 is very much like lubricator 10 and can include the various components and feature of lubricator 10 that are described within this application. However, lubricator 50 can optionally include plunger catch mechanism 52, and catcher activation and/or release mechanism 60. Plunger catch mechanism 52 can be incorporated into the configuration of lubricator 50 or can optionally be attached thereto with attachment connection 54, which itself can optionally comprise a clamp. In one embodiment, this configuration can provide a plunger catch mechanism which can operate at pressures of up to about 2,000 pounds per square inch ("psi"), 5,000 psi, 10,000 psi, 15,000 psi and/or 20,000 psi. Plunger catch mechanism 52 can optionally include sliding latch 56, which most preferably has a rounded and/or tapered end, which more easily permits a plunger to slide up past sliding latch 56. Sliding latch 56 most preferably slides within plunger catch housing 58, which as best illustrated in FIGS. 5 and 6, preferably comprises release rod 62 which is slidable within catch housing 58. Optionally, catcher activation and/or release mechanism 60 can include a handle which can optionally be disposed or otherwise formed or coupled to an end portion of release rod 62. In one embodiment, catch activation and/or release mechanism 60 can comprise a first user input apparatus for catching a plunger and a second user input apparatus for releasing the plunger. For example, a first lever or knob can be manipulated to catch a plunger and a second lever or knob can be manipulated to release a plunger. Or, a single lever or knob can be used to cause a plunger to be captured with a first motion thereof and to be released with another motion thereof. Release rod is preferably coupled to sliding latch 56 via spring 63, which is most preferably a spring that pushes sliding latch 56 toward a center portion of inner sleeve 64. Inner sleeve 64 can include catch opening 66 through which sliding latch 56 preferably passes. In one embodiment, when plunger catch mechanism 52 is provided, if a plunger is caught at the top of its stroke, a user can optionally then remove an upper portion of lubricator 10 or 50 to remove, repair, and/or replace a plunger. When the user is ready for the captured plunger to travel back down the tubing, the user can simply manipulate or otherwise activate catcher activation and/or release mechanism 60, which, depending upon the configuration of catch mechanism 52, can cause latch 56 to retract, thus allowing the plunger to fall back down the tubing. Optionally, a pneumatic and/or electric or hydraulic actuator can be coupled to release rod 62 such that the release of a captured plunger can be accomplished without manual human intervention. For example, in one embodiment, a pneumatic cylinder can be coupled to release rod 62 and a solenoid can be electronically controlled to cause the pneumatic cylinder to be activated via the solenoid at a predetermined time or after a predetermined hold time.

Figure 7A:
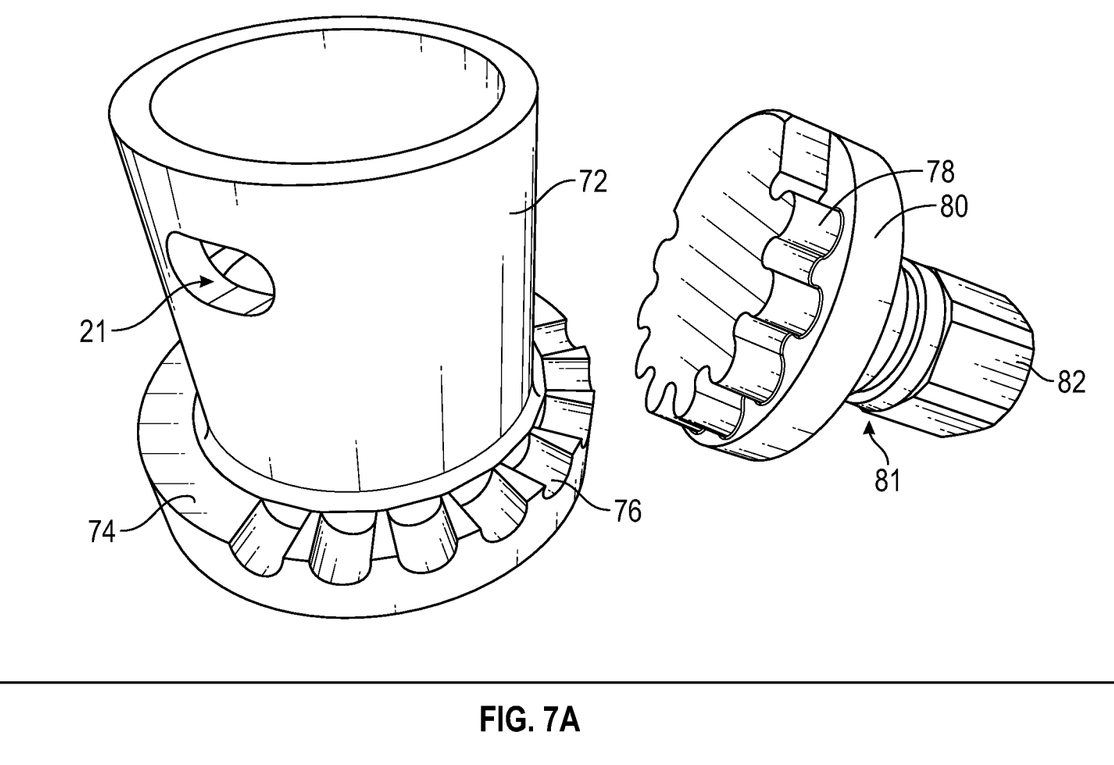
FIGS. 7A, 7B, 7C, and 7D respectively illustrate various perspectives of adjustment mechanisms for providing adjustable flow to a plunger lift lubricator according to an embodiment of the present invention.
Figure 7B:
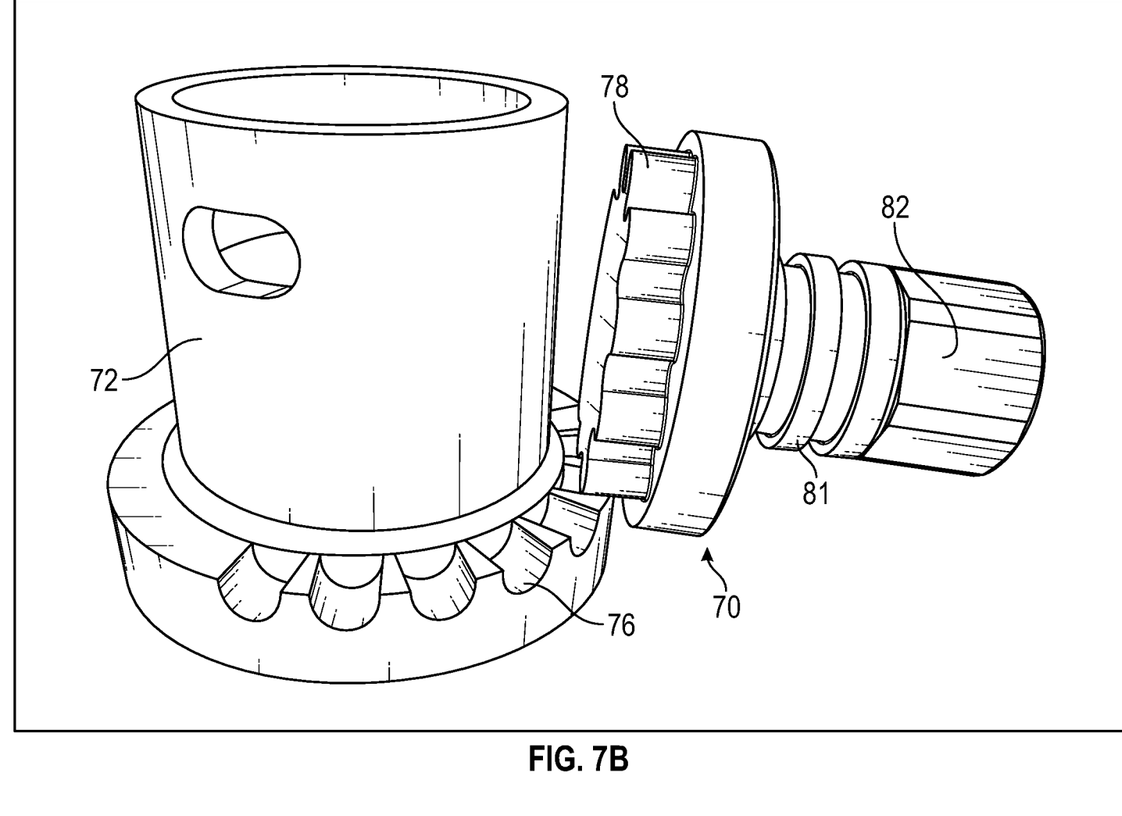
Figure 7C:
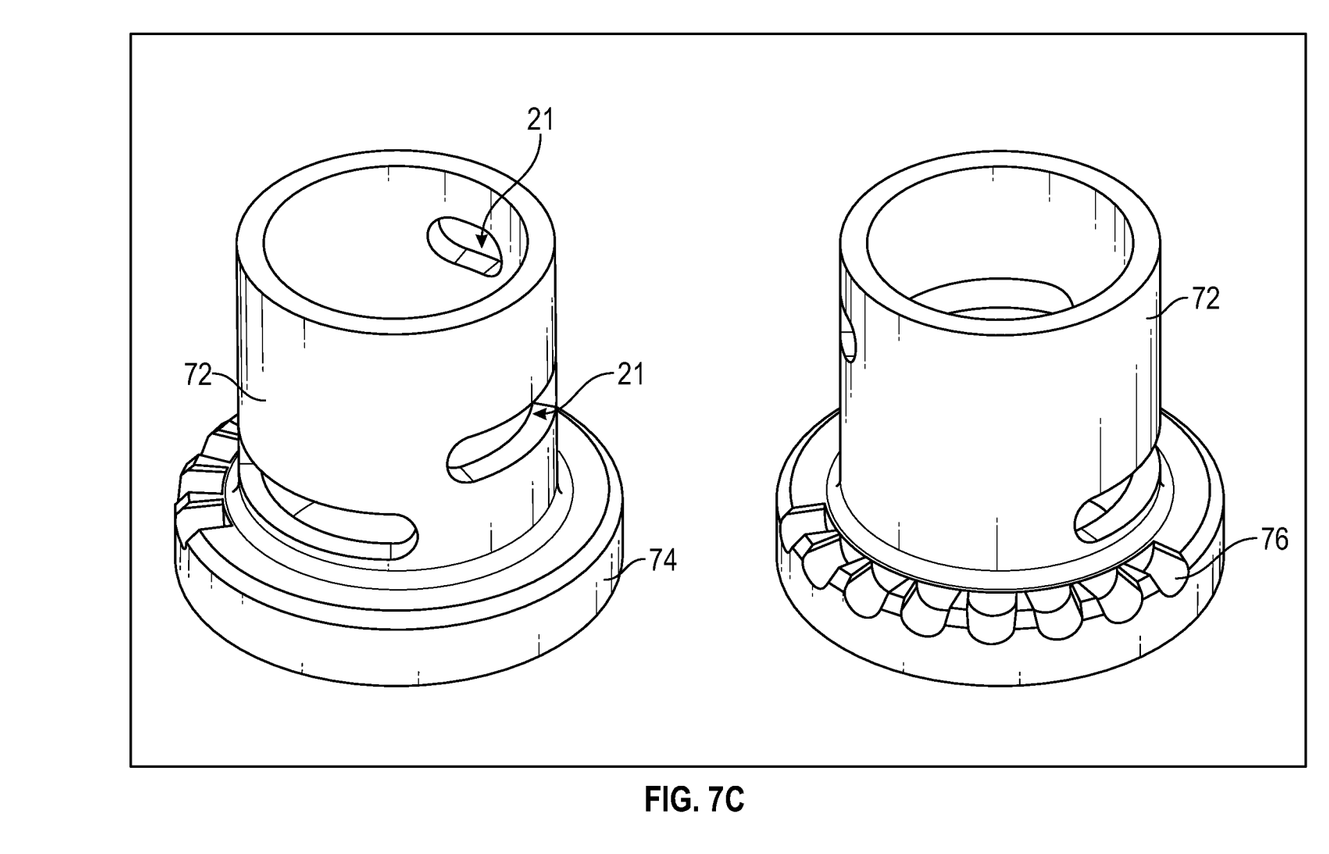
Figure 7D:
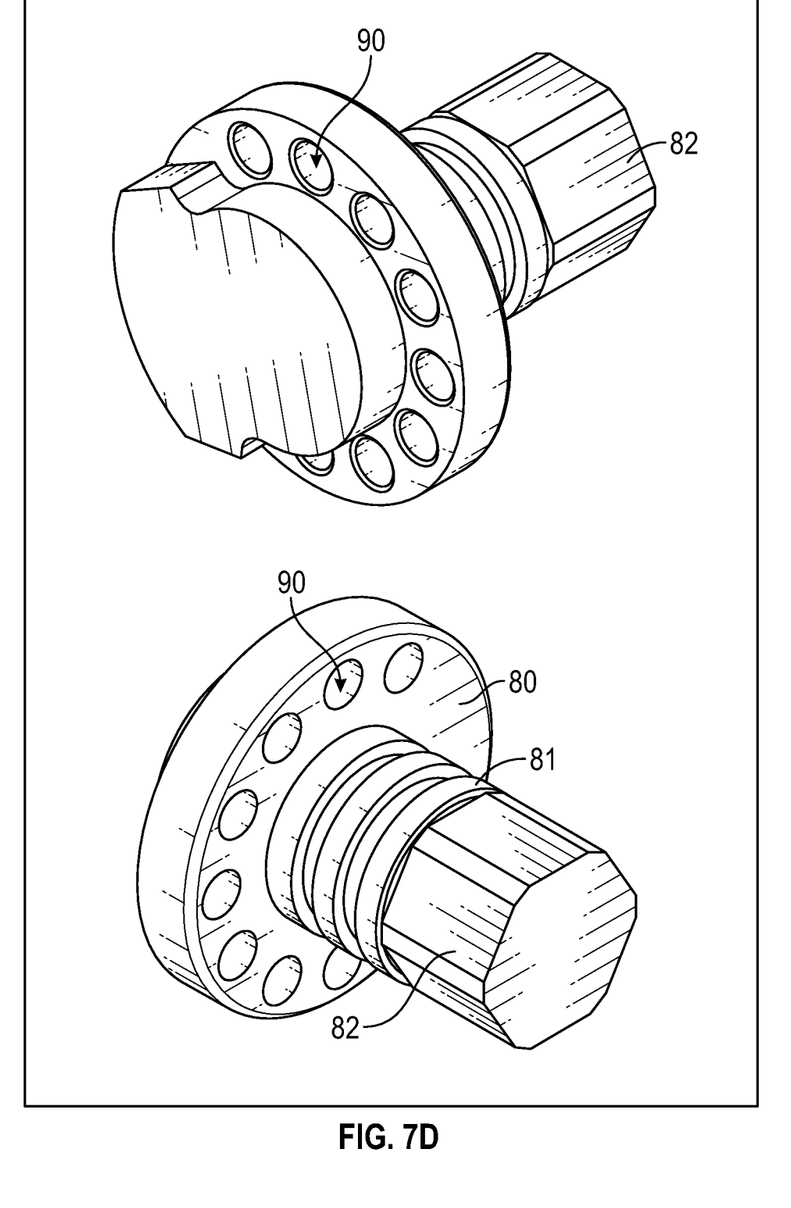

Lubricator 10 or 50 can also optionally include rotationally adjustable flow control 70. In this embodiment, instead of a single sleeve 24 (see lubricator 10 of FIG. 2) inner sleeve 64 can be disposed within outer sleeve 72. Most preferably, flow control 70 includes outer sleeve 72 with openings 21 and flange 74 which includes cogs 76, which engage with cogs 78 on flange 80 of knob 81, which itself preferably includes outer end portion 82 on which a user can place a socket or handle or other device in order to force knob 81 to rotate, thus causing outer sleeve 72 to also rotate such that openings 21 in outer sleeve move into and out of alignment with lower openings 22 in inner sleeve 64, thus enabling a user to adjust the amount of flow that can travel through a lower flow path and thereby adjust the proportion of flow that flows through an upper flow path. Thus, a user can simply rotate outer end portion 82 to adjust the proportional upper and lower flow rates and thus balance the system to accommodate different flow velocities and viscosities for any particular plunger. As best illustrated in FIG. 7D, in one embodiment, instead of milling or otherwise forming cogs in flange 80, a plurality of openings 90 can be provided and pins can be disposed therein to effectively form cogs.

Although FIG. 4B illustrates lubricator 50 as having both adjustable flow control 70 and plunger catch mechanism 52, in one embodiment, only one of flow control 70 or catch mechanism 52 can be provided. Thus, sleeve 24 of lubricator 10 can optionally comprise catch opening 66 such that plunger catch mechanism 52 can be incorporated into lubricator 10. In other words, plunger catch mechanism 52 need not be disposed on a lubricator that also includes rotationally adjustable flow control 70.

As best illustrated in FIG. 1A, a pair of tangential pins 116 can be used to hold upper and lower portions of plunger lift lubricator 10 together. The use of tangential pins 116 permits plunger lift lubricator 10 to be operated at very high pressures because the pins would have to sheer along a significant portion of them in order for them to fail. FIG. 1A also illustrates seals 124, which can optionally include O-rings or pressure activated soft material seals that seal against two or more seal bore faces. Depending on the seal to be used, seals 124 can be disposed in seal preps 122 at a lower end portion of an upper portion of plunger lift lubricator 10. Seals 124 can optionally be activated by pressure but can also optionally be mechanically activated through a mechanical form of compression. In one embodiment, seals 124 are preferably disposed below pins 116.

Note that in the specification and claims, "about", "approximately", and/or "substantially" means within twenty percent (20%) of the amount, value, or condition given.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A plunger lift lubricator comprising:
    a plunger holding area;
    an upper chamber comprising a diameter larger than a diameter of the plunger holding area;
    a plurality of radially positioned bypass openings disposed in said upper chamber; and
    a plurality of discrete internal bypass passages which extend at least a length of a plunger holding area and said plurality of discrete internal bypass passages positioned such that they are not blocked by a plunger when the plunger is disposed within the plunger holding area.

2. The plunger lift lubricator of claim 1 wherein said plunger lift lubricator is configured such that a flow of fluid can travel up through said plunger holding area and into said upper chamber before turning and exiting said upper chamber through said plurality of radially positioned bypass openings.

3. The plunger lift lubricator of claim 1 wherein said plurality of discrete internal bypass passages allow flow to an annulus formed between an exterior of said plunger holding area and a body of said plunger lift lubricator.

4. The plunger lift lubricator of claim 1 wherein said plurality of discrete internal bypass passages comprise a plurality of passages disposed outside of said plunger holding area.

5. The plunger lift lubricator of claim 1 wherein said plurality of discrete internal bypass passages a plurality of channels formed on an interior of a body of said plunger lift lubricator such that when a sleeve is positioned within said body, the said plurality of discrete internal bypass passages are formed within said plurality of channels.

6. The plunger lift lubricator of claim 1 further comprising a lower flow path.

7. The plunger lift lubricator of claim 6 wherein said lower flow path comprises at least one lower opening positioned such that it is below the plunger when the plunger is fully seated up into said plunger holding area.

8. The plunger lift lubricator of claim 7 wherein said at least one lower opening is disposed through a sleeve which forms the plunger holding area.

9. The plunger lift lubricator of claim 8 wherein said at least one lower opening comprises a plurality of lower openings.

10. The plunger lift lubricator of claim 1 further comprising a plunger catching mechanism.

11. The plunger lift lubricator of claim 10 wherein said plunger holding area comprises a sleeve and wherein said sleeve does not extend above said plunger catching mechanism.

12. The plunger lift lubricator of claim 1 further comprising a sleeve.

13. The plunger lift lubricator of claim 12 wherein said sleeve is rotationally adjustable to provide an adjustable flow.

14. A method for producing fluids through a plunger while the plunger is disposed in a plunger holding area of a plunger lift lubricator, the method comprising:
    flowing fluid up through the plunger into an upper chamber having a diameter larger than the plunger holding area, directing the fluid radially out of the upper chamber by passing the fluid through a plurality of openings disposed in the upper chamber to a distance beyond an outside of the plunger holding area, then allowing the fluid to flow down past the plunger holding area through a plurality of discrete internal bypass passages while the plunger is disposed within the plunger lift lubricator.

15. The method of claim 14 wherein allowing the fluid to flow down past the plunger holding area through the plurality discrete of internal bypass passages comprises directing the fluid to a distance beyond an outside circumference of the plunger holding area.

16. The method of claim 14 further comprising simultaneously allowing fluid to be produced by directing the fluid away from the plunger before the fluid reaches the plunger.

17. The method of claim 14 further comprising allowing fluid that flowed up through the plunger to be merged together with fluid that did not flow up through the plunger before any of the merged fluid exits the plunger lift lubricator.

18. The method of claim 14 further comprising activating a mechanism to capture the plunger such that the plunger is held within the plunger lift lubricator.

19. The method of claim 14 wherein allowing the fluid to flow down past the plunger holding area through the plurality of discrete internal bypass passages comprises allowing the fluid to flow down through an annulus formed between an exterior of a sleeve and an interior of a body of the plunger lift lubricator.

20. The method of claim 14 wherein allowing the fluid to flow down past the plunger holding area through the plurality of discrete internal bypass passages comprises allowing the fluid to flow through a plurality of passages arranged circumferentially around an exterior of a plunger holding area of the plunger lift lubricator.

21. The method of claim 14 wherein directing the fluid radially comprises passing the fluid out through a plurality of openings disposed above a top of the plunger when the plunger is disposed within the plunger holding area.

* * * * *